United States Patent
Solomon et al.

(10) Patent No.: US 8,127,843 B2
(45) Date of Patent: Mar. 6, 2012

(54) SOLIDIFICATION OF RESIDUALS FROM WATER TREATMENT SYSTEMS IN HEAVY OIL RECOVERY OPERATIONS

(75) Inventors: Robert Solomon, Seattle, WA (US); Torsten Erikson, Edmonds, WA (US)

(73) Assignee: GE Ionics, Inc., Trevose, PA (US)

(*) Notice: Subject to any disclaimer, the term of this patent is extended or adjusted under 35 U.S.C. 154(b) by 762 days.

(21) Appl. No.: 11/688,238

(22) Filed: Mar. 19, 2007

(65) Prior Publication Data
US 2007/0221376 A1 Sep. 27, 2007

Related U.S. Application Data

(60) Provisional application No. 60/743,773, filed on Mar. 24, 2006.

(51) Int. Cl.
E21B 43/00 (2006.01)
E21B 43/24 (2006.01)

(52) U.S. Cl. .................. 166/267; 166/272.3

(58) Field of Classification Search .......... None
See application file for complete search history.

(56) References Cited

U.S. PATENT DOCUMENTS

| | | | |
|---|---|---|---|
| 3,837,872 A | 9/1974 | Conner | |
| 4,116,705 A | 9/1978 | Chappell | |
| 4,149,968 A * | 4/1979 | Kupiec et al. | 210/665 |
| 4,209,335 A | 6/1980 | Katayama et al. | |
| 4,880,468 A * | 11/1989 | Bowlin et al. | 106/706 |
| 5,058,679 A | 10/1991 | Hale et al. | |
| 5,370,185 A | 12/1994 | Cowan et al. | |
| 5,423,379 A | 6/1995 | Hale et al. | |
| 5,673,753 A | 10/1997 | Hale et al. | |
| 2003/0127226 A1 * | 7/2003 | Heins | 166/303 |

OTHER PUBLICATIONS

Toray Dow Corning Silicone Co. Ltd., Ohama Yoshihiko, Patent Abstracts of Japan, Publication No. 02233542A; Publication Date: Sep. 17, 1990, "Polymer-Cement Composition" (1 page).

Cullinane, Jones, Malone, Handbook for Stabilization/Solidification of Hazardous Waste, Environmental Laboratory, USAE Waterways Experiment Station, Vicksburg, MS, Draft, Project Officer, Janet M. Houthoofd, Hazardous Waste Engineering Research Laboratory, Office of Research and Development, U.S. Environmental Protection Agency, Cincinnati, Ohio, 1986 (164 pages).

Cullinane, Jones, Malone, Spooner, Bliss, Project Summary, Handbook for Stabilization/Solidification of Hazardous Waste, United States Environmental Protection Agency, Hazardous Waste Engineering Research Laboratory, Cincinnati, Ohio, Research and Development, EPA/540/S2-86/001, Dec. 1986 (4 pages).

Stabilization/Solidifcation of Cercla and RCRA Wastes, Physical Tests, Chemical Testing Procedures, Technology Screening, and Field Activities, United States Environmental Protection Agency, Center for Environmental Research Information, Cincinnati, Ohio, Technology Transfer EPA/625/6-89/022, May 1989 (82 pages including title page and table of contents).

Adaska, Tresouthick, West, Solidification and Stabilization of Wastes Using Portland Cement, Portland Cement Association, 1991, (21 pages including title page and table of contents).

* cited by examiner

Primary Examiner — Angela M DiTrani
(74) Attorney, Agent, or Firm — R. Reams Goodloe, Jr.

(57) ABSTRACT

Solidification of water treatment wastewater brines from oil production operations. Concentrated wastewater brines from water treatment systems in heavy oil recovery operations are converted to solids suitable for landfill using Portland cement. The solidification process eliminates expensive drying equipment for wastewater brine solids, as well as the associated operation and maintenance of expensive dewatering equipment.

22 Claims, 1 Drawing Sheet

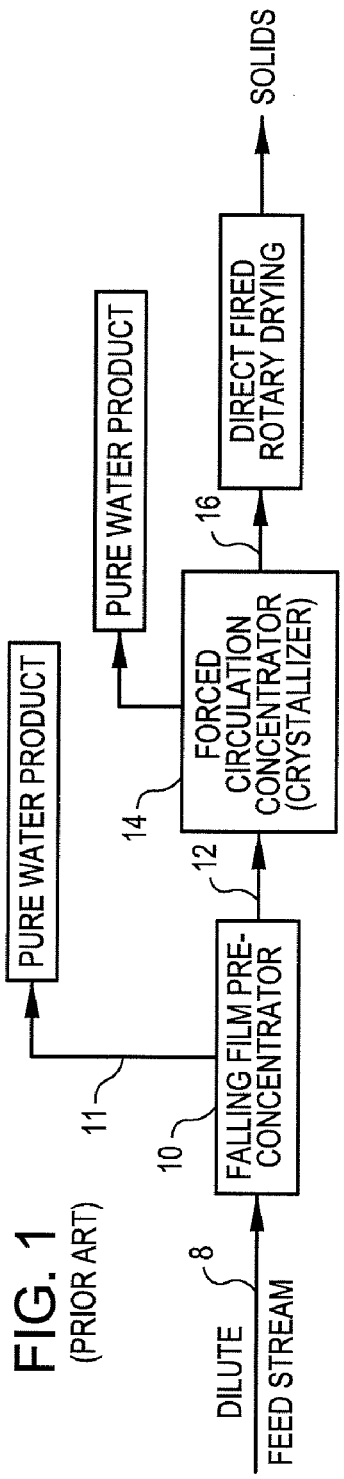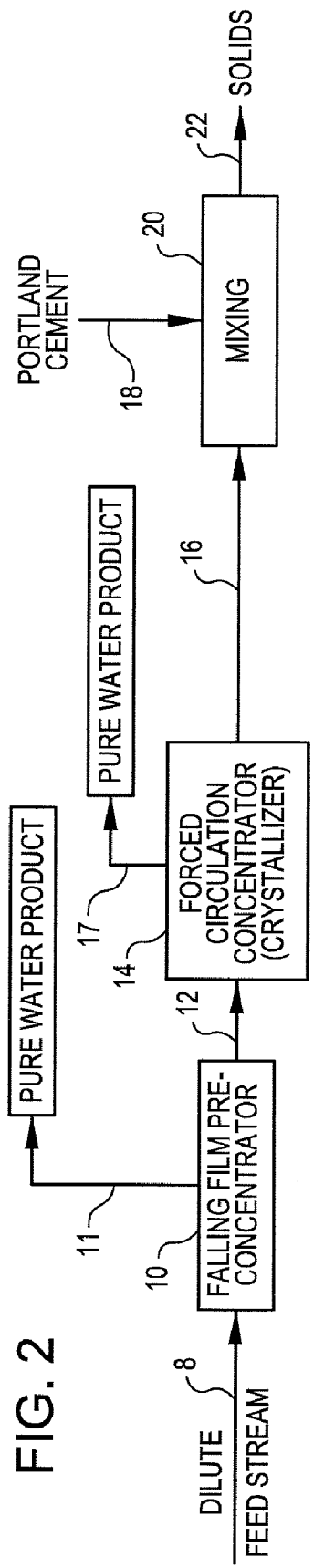

SOLIDIFICATION OF RESIDUALS FROM WATER TREATMENT SYSTEMS IN HEAVY OIL RECOVERY OPERATIONS

RELATED PATENT APPLICATIONS

This application is a Non-Provisional Patent Application based on prior U.S. Provisional Patent Application Ser. No. 60/743,773, filed Mar. 24, 2006. This application claims priority from the noted U.S. Provisional Patent Application, and the disclosure of the above identified patent application is incorporated herein in its entirety by this reference, including the specification, drawing, and claims of the patent application.

TECHNICAL FIELD

The invention disclosed and claimed herein relates to treatment of residuals resulting from treatment of water used for steam generation in operations which utilize steam to recover oil from geological formations. More specifically, this invention relates to methods for the disposal of residuals generated during treatment of oil field produced waters, especially as encountered in heavy oil recovery operations.

BACKGROUND

Steam generation is necessary in heavy oil recovery operations. This is because in order to recover heavy oil from certain geologic formations, steam is required to increase the mobility of the sought after oil within the formation. In some heavy oil recovery operations, steam may be generated in once-through type steam generators ("OTSG's") or in packaged boilers. When OTSG's are used, high blowdown rates, often in the range of from about 20% to about 30% or thereabouts are encountered. Such blowdown rates lead to significant thermal and chemical treatment inefficiencies. And, such OTSG's often operate with a feedwater that has from about 2000 mg/L to about 8000 mg/L of total dissolved solids. In any event, such once through steam generators provides a low quality or wet steam, wherein about eighty percent (80%) quality steam is produced. In other words, the 80% quality steam is about 80% vapor, and about 20% liquid, by weight percent. The steam portion, or high pressure steam produced in the steam generators is injected via steam injection wells to fluidize oil in a geologic formation, such as oils in tar sands formations. The injected steam eventually condenses and an oil/water mixture results, and which mixture migrates through the formation, and is gathered at oil/water gathering wells, through which the oil/water mixture is pumped to the surface. Then, the sought-after oil is sent to an oil/water separator in which the oil product is separated from the water and recovered for sale. The produced water stream, after separation from the oil, is further de-oiled in a de-oiling process step. The de-oiled produced water stream is then further treated for reuse in a costly water treatment plant sub-system before it can be sent to the steam generators.

In one process known as the steam assisted gravity drainage heavy oil recovery process (the "SAGD" process), it is preferred that one hundred percent (100%) quality steam be provided for injection into wells (i.e., no liquid water is to be provided with the steam to be injected into the formation). However, conventional prior art water treatment techniques present a problem for the use of once through steam generators in such a process. That is because in order to produce 100% quality steam using a once-through type steam generator, a vapor-liquid separator is required to separate the liquid water from the steam. Then, the liquid blowdown recovered from the separator is typically flashed several times in a series of flash tanks to successively recover as series of lower pressure steam flows which may sometimes be utilized for other plant heating purposes. After the last flashing stage, a residual hot water final blowdown stream must then be handled, by recycle and/or disposal. The 100% quality steam is sent down the injection well and injected into the desired geologic formation. Fundamentally, though, conventional treatment processes for produced water used to generate steam in a once-through steam generator produces a boiler blowdown which is roughly twenty percent (20%) of the feedwater volume. This results in a waste brine stream with dissolved solids content that is about fivefold the dissolved solids content of the steam generator feedwater. Such waste brine stream must be disposed of by deep well injection, or if there is limited or no deep well capacity, by further concentrating the waste brine in a crystallizer.

Another method for generating the required 100% quality steam for use in the steam assisted gravity drainage process involves the use of boilers, which may be packaged factory built boilers of various types, or which may be field assembled boilers with mud and steam drums and water wall piping. Various methods can be used for preparing water of a sufficient quality to be utilized as feedwater to a packaged boiler. Still, residual wastewater streams are produced that require further concentration before disposal, such as by a crystallizer system.

In any event, in the recovery of heavy oil using a steam assisted gravity drainage ("SAGD") or similar system utilizing steam injection methods, it is important to separate steam condensate from the recovered oil. The steam condensate or water phase must be treated and purified to meet specifications suitable for introduction of the recovered water into the steam producing boilers.

In some heavy oil recovery operations, evaporation based water treatment processes have been used for processing water from oil/water mixtures recovered from geologic formations. Suitable evaporation based water treatment processes are described in detail in (a) U.S. Pat. No. 6,733,636 B1, issued May 11, 2004, entitled Water Treatment Method for Heavy Oil Production, (b) U.S. Patent Application Publication No. US 2003/0127226, published Jun. 10, 2003, entitled Water Treatment Method for Heavy Oil Production, and (c) US Patent Application Publication No. US 2005/0022989, published Feb. 3, 2005, entitled Water Treatment Method for Heavy Oil Production, the disclosures of each of which are incorporated herein in their entirety by this reference. Additionally, a membrane based process followed by evaporation based treatment processes may be used. In any case, a relatively purified water stream is produced, and a relatively concentrated waste brine stream is produced. The waste brine stream contains dissolved and suspended solids of varying content, depending upon a myriad of factors. However, regardless of the precise waste brine stream composition, in many cases such waste brine cannot be discharged to a publicly owned water treatment plant, or injected into the earth via a deep well, due to various issues, such as regulations, unavailability of treatment facilities, or due to technical problems with deep well injection. Therefore it is common practice to treat the waste brine stream to separate the brine into an additional pure water stream and a dry solids product. The dry solids are usually sent to a landfill or buried in a production mine or pit. However, present methods of achieving such results are quite expensive, both in capital and operating cost.

By way of example, the condensate or produced water, after separation from the oil, may be pre-treated by physical-chemical methods and/or membrane processes, but may then be sent to an industrial evaporator, typically of the vertical tube falling film type. Often, boiler blow down and other wastes are combined with the produced water before feed to the evaporator. The evaporators are generally large, treating as much as 1000 US gallons per minute (227 m$^3$/hour) or more, and discharging waste water brines of approximately seven to twenty percent (7-20%) total solids from after processing a feedwater in put stream having about zero point three percent to about five percent (0.3% to about 5%) total solids. The concentrated waste brine discharged from the evaporators is then typically sent to a forced circulation crystallizer for final reduction to solids. Such crystallizers, usually of the forced circulation type, crystallize all of the solids in the waste water brine. The resultant solids are typically removed using a filter press, although other devices such as centrifuges of various types could be utilized. Such technologies are analogous to the process equipment utilized in the production of sodium chloride, or common table salt.

There is, however, a problem with the prior art approach to concentration of solids in waste brines from heavy oil production operations as just described above. The condensate or produced water stream, even after oil separation, may contain varying amounts of organic chemical species of various types. In the residual circulating brine, certain dissolved organic substances build up in the brine as it is concentrated. Such brines are often quite high in petroleum components that are chemically extractable when tested. The presence of such petroleum components hinders both crystal formation and crystal separation from the mother liquor. As a result, the devices which have heretofore been utilized for crystal separation, such as centrifuges or filter presses, are sometimes plagued with plugging, as well as with failures of various operating parts.

In order to overcome the just mentioned crystallization and separation difficulties, other process changes and equipment additions have been tried. For example, in one approach, a forced circulation crystallizer is utilized as in the previously described practice. However the crystallizer is employed as a concentrator, and crystals are not separated from the brine. In such a design, the use of centrifuges or filter presses is eliminated. Brine of about fifty to about sixty percent (50-60%) total solids is typically discharged. The waste brine, at from about fifty to about sixty percent (50%-60%) total solids is then treated in a rotary dryer, which is direct fired with heated air. The heated, dry solids are then discharged. Such a drying process is extremely complicated, however, as well as capital intensive and complicated to operate. Further, many such dryers require a feed stream of about ninety percent (90%) or more solids by weight for continuous operation. Therefore a large recycle stream, which returns dried solids product back to the dryer feed stream, is required. Such practice necessitates a pug mill and recycle bucket conveyer system, for conditioning and handling of the dry solids recycle stream. Due to the high temperature and corrosive nature of the feed brine stream, expensive alloy materials, such as nickel-chromium-molybdenum alloys, are required materials of construction for the dryer. Needless to say, the entire system is very capital intensive.

In summary, when used in water treatment systems in heavy oil recovery operations, a wastewater crystallizer often encounters difficulty in completion of the drying and in extraction of a solids product, since inorganic salts that are normally crystallized easily are not easily generated by the crystallizer, evidently due to the presence of various "non-extractable organics" present in the waste brine stream that is to be concentrated. In other words, the easily removed organics components, especially the oily components, are separated and sent for final processing before marketing, but the separation process leaves behind various organic substances, including humic and fulvic acid compounds, that collectively interfere with crystal formation as the waste stream is in the final concentration stages, and which interfere with the separation of crystals from a circulating crystallizer brine.

It is clear that the development of a simpler, more cost effective approach to disposal of concentrated brines resulting from produced water treatment in heavy oil operations would be desirable. Thus, it can be appreciated that it would be advantageous to provide a treatment process which minimizes or eliminates the production of undesirable liquid waste streams, while minimizing the overall costs of constructing, operating, and maintaining a water treatment plant utilized for the support of heavy oil recovery operations.

BRIEF DESCRIPTION OF THE DRAWING

The present invention will be described by way of exemplary embodiments, illustrated in the accompanying drawing in which like references denote similar elements, and in which:

FIG. 1 illustrates a basic process flow schematic of a typical prior art process.

FIG. 2 illustrates a basic process flow schematic of a new process for solidification of brines from waste water treatment systems in heavy oil operations.

The foregoing figures, being merely exemplary, contain various elements that may be present or omitted from actual embodiments which may be implemented, depending upon the circumstances. An attempt has been made to draw the figures in a way that illustrates at least those process elements that are significant for an understanding of the various embodiments and aspects of the invention. However, various other elements of a solidification process may be utilized in order to provide a versatile process for reliably solidifying the waste streams from a waste water treatment plant supporting heavy oil recovery operations, in accordance with the teachings hereof and the claims set forth hereinbelow.

DETAILED DESCRIPTION

Various heavy oil recovery techniques employ the use of steam for downhole injection, via a plurality of injection wells, to mobilize heavy oil in a geologic formation. A resultant oil/water is collected via a plurality of recovery wells. The valuable oil product is separated from the produced water via a suitable de-oiling process unit. The produced water is the product of condensate from the injected steam, as well as groundwater and dissolved solids from the geologic formation. The dilute de-oiled produced water feed stream 8 is treated in concentration based treatment equipment, such as a falling film evaporator or pre-concentrator 10 to produce a relatively pure water 11 suitable for polishing and feed to high pressure boilers, for preparation of steam for injection. Also, a combination of membrane separators and evaporators could be utilized. The concentration based treatment equipment produces a relatively concentrated wastewater brine 12, that is fed to a forced circulation concentrator 14. Such concentrated wastewater brine 12 contains dissolved solids, often predominantly sodium chloride, as well as a variety of other constituents. When high pH operation is conducted, e.g., operation at a pH of about 10, or higher, or more preferably at about 11, or higher, the concentrated wastewater brine 12 often contains significant amounts of silica. Also, a variety of organic compounds, especially "non-extractable organics" are frequently found. When concentrated wastewater brines 12 from concentration based treatment equipment is further processed in a crystallizer 14, it has been found that crystallization is much more difficult than is the case with purely inorganic chemical crystallization. Moreover, the separation of crystals from a circulating mother liquor in a crystallizer is difficult, and even when workable, requires expensive equipment.

In any event, the forced circulation concentrator 14 produces a hot concentrated wastewater brine 16 and a second relatively pure water product 17. However, it is the handling of the concentrated wastewater brine 16 that has been found to be problematic. Therefore, further options have been sought to prepare the concentrated wastewater brine stream 16 for disposal.

It has been found that a hot concentrated wastewater brine 16 that is discharged from crystallizers 14 used in heavy oil recovery operations can be effectively rendered suitable for disposal in solid form by solidification. In one embodiment, a suitable form of solidification agent has been found to be a cementious alkali formulation. One suitable form for a solidification agent has been found to be a Portland cement composition 18, which is added with concentrated brine 16 to a mixer 20, to produce a wet mixed cement-brine product 22, that sets up over time. In tests for one embodiment of the method taught herein, one form of Portland cement, namely No. 1 or Type 1 Portland cement, has been found to provide solids suitable for landfill even on high saline brines resulting from wastewater treatment in heavy oil recovery operations.

Examples of test results are explained below:

EXAMPLE 1

A fifty five percent (55%) by weight concentrated brine containing sodium chloride crystals was evaluated. The brine was sticky but pumpable. A glass jar was charged with 101.4 grams of brine and 20.0 grams of No. 1 Portland cement. The contents were homogenized for approximately 30 seconds using a propeller driven by a hand drill to produce a wet cement-brine mixture. The resultant wet cement-brine mixture was placed in a hot water bath (160° F. to 180° F.) for fifteen minutes. The wet cement-brine mixture was then removed from the water bath and allowed to cool. After 20 hours, the composition was completely set as a solid.

EXAMPLE 2

A fifty five percent (55%) by weight concentrated brine containing sodium chloride crystals was evaluated. The brine was sticky but pumpable. A glass jar was charged with 86.6 grams of brine and 40.0 grams of No. 1 Portland cement. The contents were homogenized for approximately 30 seconds using a propeller driven by a hand drill to produce a wet cement-brine mixture. The resultant wet cement-brine mixture was placed in a hot water bath (160° F. to 180° F.) for fifteen minutes. The wet cement-brine mixture was then removed from the water bath and allowed to cool. After 5 hours, the composition was completely set as a solid.

EXAMPLE 3

A fifty five percent (55%) by weight concentrated brine containing sodium chloride crystals was evaluated. The brine was sticky but pumpable. A glass jar was charged with 93.7 grams of brine and 60.0 grams of No. 1 Portland cement. The contents were homogenized for approximately 30 seconds using a propeller driven by a hand drill to produce a wet cement-brine mixture. The resultant wet cement-brine mixture was placed in a hot water bath (160° F. to 180° F.) for fifteen minutes. The wet cement-brine mixture was then removed from the water bath and allowed to cool. After 5 hours, the composition was completely set as a solid.

EXAMPLE 4

A fifty five percent (55%) by weight concentrated brine containing sodium chloride crystals was evaluated. The brine was sticky but pumpable. A glass jar was charged with 91.0 grams of brine and 80.0 grams of No. 1 Portland cement. The contents were homogenized for approximately 30 seconds using a propeller driven by a hand drill to produce a wet cement-brine mixture. The resultant wet cement-brine mixture was placed in a hot water bath (160° F. to 180° F.) for fifteen minutes. The wet cement-brine mixture was then removed from the water bath and allowed to cool. After 5 hours, the composition was completely set as a solid.

Thus, it has been found that wastewater brines containing significant amounts (up to 30% or more) of sodium chloride (and in some embodiments, further including crystalline sodium chloride), as well as silica (in the 1-2% range, or more), and various organics, can be effectively solidified using Portland cement compositions. Such waste brines may generally range from about forty percent (40%) solids to about sixty percent (60%) in total dissolved solids.

Studies have shown that as little as 50% by weight of Portland cement without any other additives can solidify such concentrated wastewater brines. In various cases, brine may be mixed with Portland cement and used at rates of from about 5:1 by weight (concentrated wastewater brine to Portland cement ratio) to about 1:1, solidify the concentrated wastewater brine. In some embodiments, such a cementious alkali formulation may be utilized without additional additives. In one embodiment, the resultant solidified waste brine is capable of passing the US EPA Paint Filter Test (Standard Method 9095), which in the United States is generally considered a mandatory test for acceptance of dry solids for disposal at a legally permitted landfill. Further, the above described process may be even further enhanced by admixture with bentonite clay, or certain polymeric compositions.

Portland cement meeting the ASTM C150 specification may be utilized where available. In one embodiment, Portland cements having suitable compositions maybe provided from suitable compositions comprising calcium oxide, as CaO, at about 61% to about 67%, silicon oxide, as $SiO_2$ at 19% to about 23% aluminum oxide, as $Al_2O_3$, at about 2.5% to about 6%, ferric oxide, as $Fe_2O_3$ at from about 0% to about 6% by mass, and gypsum, as $CaSO_4$, from about 2 to about 10%. The European Standard EN197.1 defines Portland Cement as follows: "Portland cement clinker is a hydraulic material which shall consist of at least two-thirds by mass of calcium silicates ($3CaO.SiO_2$ and $2CaO.SiO_2$), the remainder consisting of aluminum- and iron-containing clinker phases and other compounds. The ratio of CaO to $SiO_2$ shall not be less than 2.0. The magnesium content (MgO) shall not exceed 5.0% by mass." As noted in the examples set forth above, Type I (or "No. 1") Portland Cement may be utilized to provide suitable solidification results. In yet other embodiments, a Type II Portland cement, with moderate resistance to sulfate attack may be utilized. In another embodiment, a Type IV Portland cement, with high sulfate resistance, may be utilized. For such sulfate resistant cements, it is necessary to limit the amount of tricalcium aluminate ($3CaO.Al_2O_3$)

formed. Further detailed description and background on Portland cement and various types thereof may be found at the web pages of the United States Department of Transportation, Federal Highway Administration, web pages, as follows: http://www.fhwa.dot.gov/infrastructure/materialsgrp/cement.html.

The above described solidification method may be advantageously carried out using a mix tank, or a cement mixer. Such a treatment method, and the equipment arrangement necessary for carrying out the method, represents a significant cost reduction and increased operational simplicity over the prior art treatment methods.

Although only several exemplary embodiments of this invention have been described in detail, it will be readily apparent to those skilled in the art that the novel method for solidification of residuals form heavy oil recovery operations, and the apparatus for implementing the process, may be modified from the exact embodiments provided herein, without materially departing from the novel teachings and advantages provided by this invention, and may be embodied in other specific forms without departing from the spirit or essential characteristics thereof. Therefore, the disclosure presented herein is to be considered in all respects as illustrative and not restrictive. It will thus be seen that the objects set forth above, including those made apparent from the preceding description, are efficiently attained. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the drawing) may be combined in any combination, except combinations where at least some of the features are mutually exclusive. Alternative features serving the same or similar purpose may replace each feature disclosed in this specification (including any accompanying claims, and the drawing), unless expressly stated otherwise. Thus, each feature disclosed is only one example of a generic series of equivalent or similar features. Further, while certain process steps are described for the purpose of enabling the reader to make and use certain solidification processes shown, such suggestions shall not serve in any way to limit the claims to the exact variation disclosed, and it is to be understood that other variations, including various treatment additives or solidification may be utilized in the practice of the method.

The intention is to cover all modifications, equivalents, and alternatives falling within the scope and spirit of the invention, as expressed herein above and in any appended claims. The scope of the invention, as described herein and as indicated by any appended claims, is thus intended to include variations from the embodiments provided which are nevertheless described by the broad meaning and range properly afforded to the language of the claims, as explained by and in light of the terms included herein, or the legal equivalents thereof.

The invention claimed is:

1. A method for solidifying a concentrated wastewater brine from wastewater treatment systems in heavy oil recovery operations, the heavy oil recovery operations comprising (i) injecting steam into a geologic formation, (ii) recovering an oil-water mixture, (iii) separating the oil and the water from the oil-water mixture, said method comprising:
   (a) concentrating the separated water to produce a concentrated wastewater brine;
   (b) adding a cementious alkali formulation to the concentrated wastewater brine to produce a wet cement-brine mixture;
   (c) allowing the wet cement-brine mixture to solidify;
   (d) wherein the ratio of concentrated wastewater brine to said cementious alkali formulation is in the range of from about 5:1 to about 1:1, by weight.

2. The method as set forth in claim 1, wherein said cementious alkali formulation comprises Portland cement.

3. The method as set forth in claim 2, wherein said Portland cement comprises No. 1 Portland cement.

4. The method as set forth in claim 1, wherein the concentrated wastewater brine is saturated in sodium chloride.

5. The method as set forth in claim 4, wherein the concentrated wastewater brine further comprises crystalline sodium chloride.

6. The method as set forth in claim 1, wherein the concentrated wastewater brine comprises silica.

7. The method as set forth in claim 1, wherein the concentrated wastewater brine comprises non-extractable organic compounds.

8. The method as set forth in claim 1, further comprising addition of clay to said concentrated wastewater brine and said cementious alkali formulation.

9. The method as set forth in claim 8, wherein said clay comprises bentonite.

10. The method as set forth in claim 1 or in claim 8, further comprising addition of polymer, and mixing said polymer with said cementious alkali formulation and said concentrated wastewater brine.

11. A method for treatment of wastewaters resulting from heavy oil recovery operations, the heavy oil recovery operations comprising (i) injecting steam into a geologic formation, (ii) recovering an oil-water mixture, (iii) separating the oil and the water from the oil-water mixture, said method comprising:
   (a) concentrating the separated water in a falling film evaporator to produce a recovered water stream and an evaporator concentrate stream;
   (b) concentrating the evaporator concentrate stream in a forced circulation crystallizer to produce a concentrated wastewater brine;
   (c) adding Portland cement to the concentrated wastewater brine to produce a wet cement-brine mixture;
   (d) allowing the wet cement-brine mixture to solidify;
   (e) wherein the ratio of concentrated wastewater brine to Portland cement is in the range of from about 5:1 to about 1:1, by weight.

12. The method as set forth in claim 11, wherein the Portland cement comprises No. 1 Portland cement.

13. The method as set forth in claim 11, wherein the concentrated wastewater brine is saturated in sodium chloride.

14. The method as set forth in claim 13, wherein the concentrated wastewater brine further comprises crystalline sodium chloride.

15. The method as set forth in claim 11, wherein the concentrated wastewater brine comprises silica.

16. A method for solidifying a concentrated wastewater brine from wastewater treatment systems in heavy oil recovery operations, the heavy oil recovery operations comprising (i) injecting steam into a geologic formation, (ii) recovering an oil-water mixture, (iii) separating the oil and the water from the oil-water mixture, said method comprising:
   (a) concentrating the separated water to produce a concentrated wastewater brine;

(b) adding a reactive, solidifiable material to the concentrated wastewater brine to produce a wet cementious-brine mixture, said reactive, solidifiable material consisting essentially of Portland cement, and wherein the ratio of concentrated wastewater brine to said Portland cement is provided in the range from about 5:1 to about 1:1 by weight;

(c) allowing the wet cementious-brine mixture to solidify.

17. The method as set forth in claim 16, wherein the concentrated wastewater brine is saturated in sodium chloride.

18. The method as set forth in claim 16, wherein the concentrated wastewater brine further comprises crystalline sodium chloride.

19. The method as set forth in claim 16, wherein the concentrated wastewater brine comprises silica.

20. A method for producing steam for downhole injection in the recovery of heavy oil, said method comprising:

(a) providing an oil/water mixture gathered from an oil/water collection well;

(b) separating oil from said oil/water mixture to provide an oil product and a produced water product containing oil therein;

(c) de-oiling said oil containing produced water product to at least partially provide an evaporator feedwater stream, said evaporator feedwater stream comprising water, dissolved gases, and dissolved solutes, said dissolved solutes comprising calcium, sulfate, and silica;

(d) providing an evaporator having a plurality of heat transfer elements, a liquid containing sump reservoir, and a recirculating pump to recycle liquid from said sump into a heat transfer relationship with said heat transfer elements;

(e) injecting said evaporator feedwater stream into said evaporator and evaporating a portion of said feedwater stream to produce a concentrated brine;

(f) recirculating said concentrated brine in said evaporator and distributing said concentrated brine on a first surface of at least one of said plurality of heat transfer elements to generate a steam vapor;

(g) compressing said steam vapor to produce a compressed steam vapor;

(h) directing said compressed steam vapor to a second surface of at least one of said plurality of heat transfer elements to condense said compressed steam vapor and to form a distillate (i) collecting said distillate stream;

(j) discharging at least some of said concentrated brine as an evaporator blowdown stream;

(k) introducing said distillate stream into a steam generator, to produce
(i) high pressure steam,
(ii) a boiler blowdown stream, said boiler blowdown stream comprising water and residual dissolved solids;

(l) injecting said high pressure steam in an injection well to fluidize oil present in a selected geological formation, to produce an oil and water mixture;

(m) gathering said oil/water mixture;

(n) concentrating said evaporator blowdown stream in a forced circulation crystallizer to produce a concentrated wastewater brine;

(o) adding Portland cement to the concentrated wastewater brine to produce a wet cement-brine mixture;

(p) allowing the wet cement-brine mixture to solidify.

21. The method as set forth in any one of claim 1, 11, 16, or 20, wherein said concentrated wastewater brine is provided at a pH of about 10, or higher.

22. The method as set forth in any one of claim 1, 11, 16, or 20, wherein said concentrated wastewater brine is provided at a pH of about 11, or higher.

* * * * *